(12) United States Patent
Ueda et al.

(10) Patent No.: US 12,521,219 B2
(45) Date of Patent: Jan. 13, 2026

(54) DENTAL TREATMENT APPARATUS

(71) Applicant: J. MORITA MFG. CORP., Kyoto (JP)

(72) Inventors: Tomoaki Ueda, Kyoto (JP); Koichiro Adachi, Kyoto (JP); Kazunari Matoba, Kyoto (JP)

(73) Assignee: J. MORITA MFG. CORP., Kyoto (JP)

( * ) Notice: Subject to any disclaimer, the term of this patent is extended or adjusted under 35 U.S.C. 154(b) by 519 days.

(21) Appl. No.: 17/534,715

(22) Filed: Nov. 24, 2021

(65) Prior Publication Data

US 2022/0160487 A1 May 26, 2022

(30) Foreign Application Priority Data

Nov. 26, 2020 (JP) ................. 2020-195975

(51) Int. Cl.
*A61C 19/04* (2006.01)
*A61B 18/00* (2006.01)
(Continued)

(52) U.S. Cl.
CPC ........ *A61C 19/042* (2013.01); *A61B 18/1233* (2013.01); *A61B 18/14* (2013.01); *A61C 5/44* (2017.02); *A61C 19/041* (2013.01); *A61B 2018/00595* (2013.01); *A61B 2018/00642* (2013.01); *A61B 2018/00702* (2013.01); *A61B 2018/0072* (2013.01);
(Continued)

(58) Field of Classification Search
CPC ................... A61C 5/40; A61C 19/042
See application file for complete search history.

(56) References Cited

U.S. PATENT DOCUMENTS 1,713,971 A * 5/1929 Lowry ............ A61C 5/40
606/49
5,931,836 A * 8/1999 Hatta ............ A61B 18/1206
606/45

(Continued)

FOREIGN PATENT DOCUMENTS

| CN | 1224339 A | 7/1999 |
|---|---|---|
| CN | 110248619 A | 9/2019 |

(Continued)

OTHER PUBLICATIONS

Notice of Reasons for Refusal issued Jan. 31, 2023 in Japanese Patent Application No. 2020-195975 (with English machine translation), 8 pages.

(Continued)

*Primary Examiner* — Heidi M Eide
(74) *Attorney, Agent, or Firm* — Oblon, McClelland, Maier & Neustadt, L.L.P.

(57) ABSTRACT

A dental treatment apparatus includes a holder, a power supply, root canal length measurement circuitry, and control circuitry. The holder holds an electrode placed in a root canal. The power supply energizes file with a high-frequency current. The root canal length measurement circuitry electrically measures a position of a distal end of electrode in the root canal. The control circuitry causes, in accordance with information on the position of the distal end of the electrode measured by root canal length measurement circuitry, the power supply to control a current value of the high-frequency current which energizes the electrode.

17 Claims, 10 Drawing Sheets

(51) Int. Cl.
  *A61B 18/12* (2006.01)
  *A61B 18/14* (2006.01)
  *A61C 5/44* (2017.01)
(52) U.S. Cl.
  CPC .............. *A61B 2018/00732* (2013.01); *A61B 2018/00738* (2013.01); *A61B 2018/00779* (2013.01)

(56) References Cited

U.S. PATENT DOCUMENTS

| | | | |
|---|---|---|---|
| 8,932,055 B2* | 1/2015 | Armanino | A61C 5/50 433/32 |
| 2002/0055085 A1* | 5/2002 | Perdomini | A61B 18/1206 433/215 |
| 2010/0143861 A1 | 6/2010 | Gharib et al. | |
| 2010/0209867 A1* | 8/2010 | Becker | A61C 5/50 433/32 |
| 2013/0224677 A1* | 8/2013 | Yamashita | A61C 19/042 433/27 |
| 2017/0105823 A1* | 4/2017 | Lueckel | A61C 17/221 |
| 2017/0216579 A1 | 8/2017 | Becker et al. | |

FOREIGN PATENT DOCUMENTS

| | | |
|---|---|---|
| EP | 2 345 388 A1 | 7/2011 |
| JP | 4-30509 U | 3/1992 |
| JP | 6-27134 Y2 | 7/1994 |
| JP | 7-51293 A | 2/1995 |
| JP | 7-163597 A | 6/1995 |
| JP | 4041165 B2 | 1/2008 |
| JP | 4469015 B1 | 5/2010 |
| JP | 2011-193907 A | 10/2011 |
| JP | 2012-507385 A | 3/2012 |
| WO | WO97/46710 A1 | 12/1997 |
| WO | WO-2008114243 A1 * | 9/2008 ............. A61B 18/14 |
| WO | WO-2008114244 A1 * | 9/2008 ............. A61B 18/14 |
| WO | WO 2010/052717 A1 | 5/2010 |

OTHER PUBLICATIONS

Extended European Search Report issued Apr. 4, 2022, in EP21209875.0—6 pages.
Bando, et al. "Application of electro-magnetic wave irradiation for endodontic treatment—EMAT (electro-magnetic apical treatment)", The Journal of Japan Endodontic Association, vol. 32, 2011, pp. 184-200 (with English Abstract).
Combined Chinese Office Action and Search Report dated Mar. 23, 2024 issued in corresponding Chinese Patent Application No. 202111397382.2 (with English machine-generated translation), 13 pages.
Japanese Office Action issued Jul. 11, 2023, in Japanese Patent Application No. 2020-195975 (with English translation), 22 pages.
Japanese Office Action issued Jul. 11, 2023, in Japanese Patent Application No. 2020-195975 (with English translation), 2 pages.
Medical Device Center Foundation, "Basic Knowledge of Medical Devices, 2nd Edition", Yakuji Nipposha Co., Ltd., Dec. 10, 2008, pp. 131-135, w/English Abstract.
Watanabe et al., "1. Principles of electric scalpel and possible adverse events", Kanehara Publishing Co., Ltd., "Surgery vol. 73, No. 11 (Oct. 2019 issue)", pp. 1515-1521, w/English Abstract.
Fukushima, "Knowing Bacteria: Changing the End", Eisue Shofen Publishing Co.,Ltd., Jun. 1, 1999, pp. 142-150, w/English Abstract.

* cited by examiner

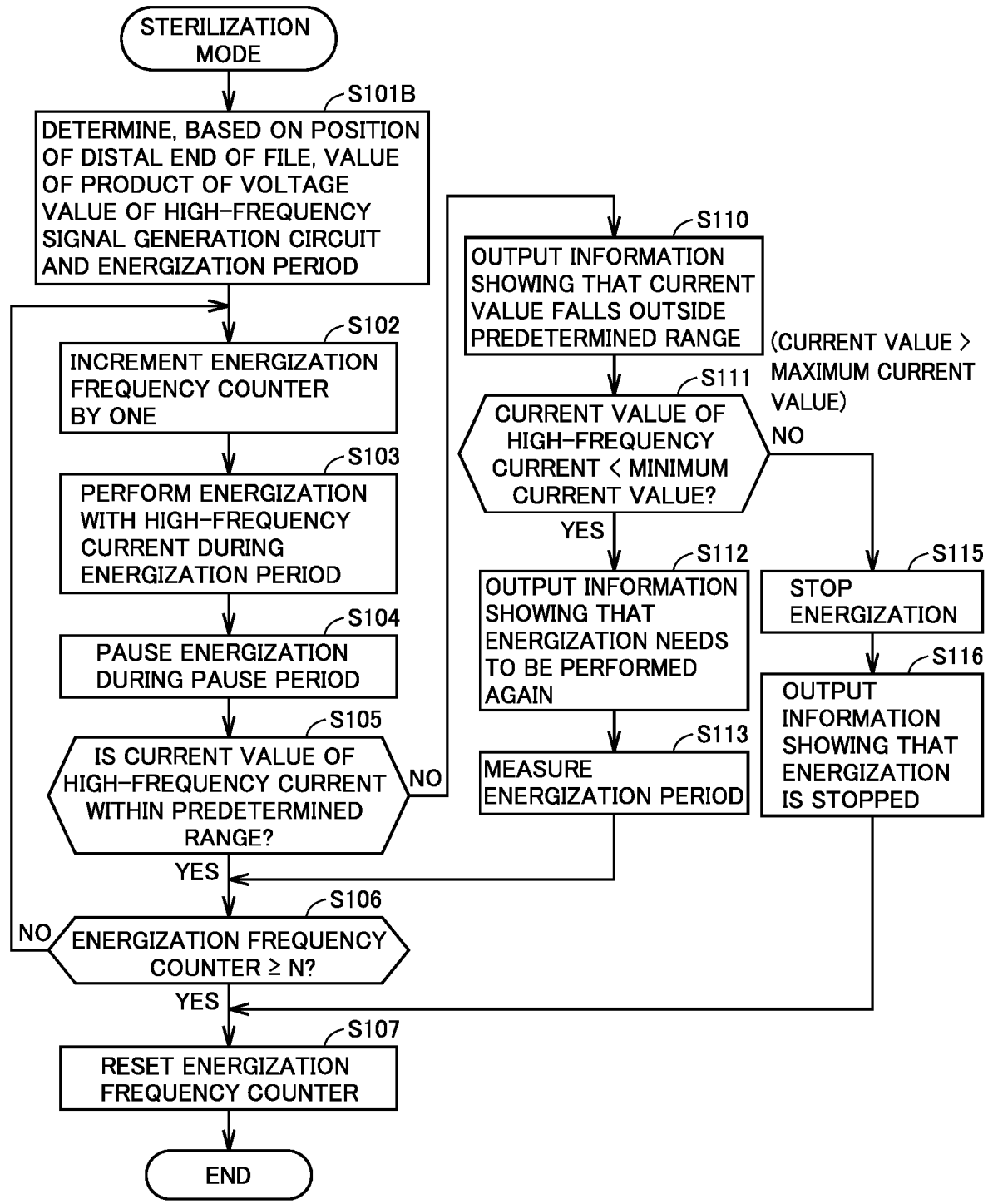

DENTAL TREATMENT APPARATUS

CROSS-REFERENCE TO RELATED APPLICATIONS

This application claims priority under 35 U.S.C. § 119 from Japanese Patent Application No. 2020-195975, filed Nov. 26, 2020. The entire content of the above application is incorporated herein by reference.

BACKGROUND OF THE INVENTION

Field

The present disclosure relates to a dental treatment apparatus that energizes a dental treatment site with a high-frequency current.

Description of the Background Art

In the dental field, root canal treatment for teeth may be performed to remove dental pulp or to mitigate inflammation at a root apex. In such a root canal treatment, a root canal is cut and widened with a reamer and a file, contaminated tissue or contaminants in the root canal are removed, and then the root canal is filled with a medicament.

The root canal, however, has a complex shape, and the shape differs from tooth type to tooth type and from person to person. It is therefore difficult for the root canal treatment to widen some portion of the root canal even with a reamer and a file, which may cause an inflammation factor to remain such that the root canal cannot be widened and that inflammation occurs after the treatment.

Japanese Patent No. 4041165 discloses dental medical equipment that applies high-frequency electron pulses to the inside of a root canal. Such medical equipment applies, when a needle-shaped electrode (for example, a file) is inserted into a root canal, and a distal end of the needle reaches a root apex, the high-frequency electron pulses to cauterize dental pulp and the like.

Further, WO 2008/114244 A discloses a dental treatment apparatus that performs root canal treatment for reducing an inflammation factor, bacteria, and the like in the root canal of a tooth. In such a dental treatment apparatus, a dental instrument capable of communicating with a measuring instrument that measures the position of the root apex includes an electrode to be inserted into the root canal. The dental instrument is further capable of communicating with a unit that applies electric pulses. This allows the dental treatment apparatus to apply electric pulses to the root canal through the electrode inserted into the root canal to reduce an inflammation factor, bacteria, and the like in the root canal with the help of the application of electric pulses.

SUMMARY

A part subjected to the root canal treatment includes hard tissue such as a tooth and soft tissue such as granulation, and even when energization with a high-frequency current having the same current value is performed, pain may be caused in soft tissue where nerves exist. In particular, in the vicinity of the root apex, there are many soft tissue portions, and it is therefore necessary to pay special attention when such portions are energized with a high-frequency current as compared with the other portions. In general, the closer the electrode is to the root apex, the more carefully the operation needs to be performed, and it is therefore necessary to perform energization with an optimum current value or change a current with which energization is performed in accordance with each electrode position even when energization with a high-frequency current is performed.

For the dental treatment apparatus according to WO 2008/114244 A, however, only a configuration where electric pulses are automatically transmitted to the root canal via the electrode when the electrode reaches a predetermined position is disclosed, and thus, pain may be caused by energization in a manner that depends on the position of the electrode in the root canal. Further, it is possible to apply anesthesia in order to reduce the pain caused by the energization, but, when anesthesia is applied in dental treatment, it will take about 10 minutes to 15 minutes until the effect of the anesthesia is exerted, which reduces treatment efficiency. Furthermore, neither energization with the optimum current value nor a change in the current with which energization is performed is made in accordance with the position of the electrode in the root canal, and thus, there is a possibility of destroying important tissue at the root apex.

The present disclosure solves, at least, the above-described problems, and it is therefore an object of the present disclosure to provide a dental treatment apparatus capable of energizing an electrode inserted into a root canal with a high-frequency current having an optimum current value without reducing treatment efficiency.

A dental treatment apparatus according to the present disclosure energizes a root canal with a high-frequency current. The dental treatment apparatus includes a holder, a power supply, a root canal length measurement unit, and a controller. The holder holds an electrode placed in the root canal. The power supply energizes the electrode with the high-frequency current. The root canal length measurement unit electrically measures a position of a distal end of the electrode in the root canal. The controller causes, in accordance with information on the position of the distal end of the electrode measured by root canal length measurement unit, the power supply to control a current value of the high-frequency current with which the electrode is energized.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 10 is a flowchart for describing control, in the sterilization mode, of a dental treatment apparatus according to a fourth embodiment.

DETAILED DESCRIPTION

Hereinafter, embodiments according to the present disclosure will be described with reference to the drawings.

First Embodiment

Figure 1:
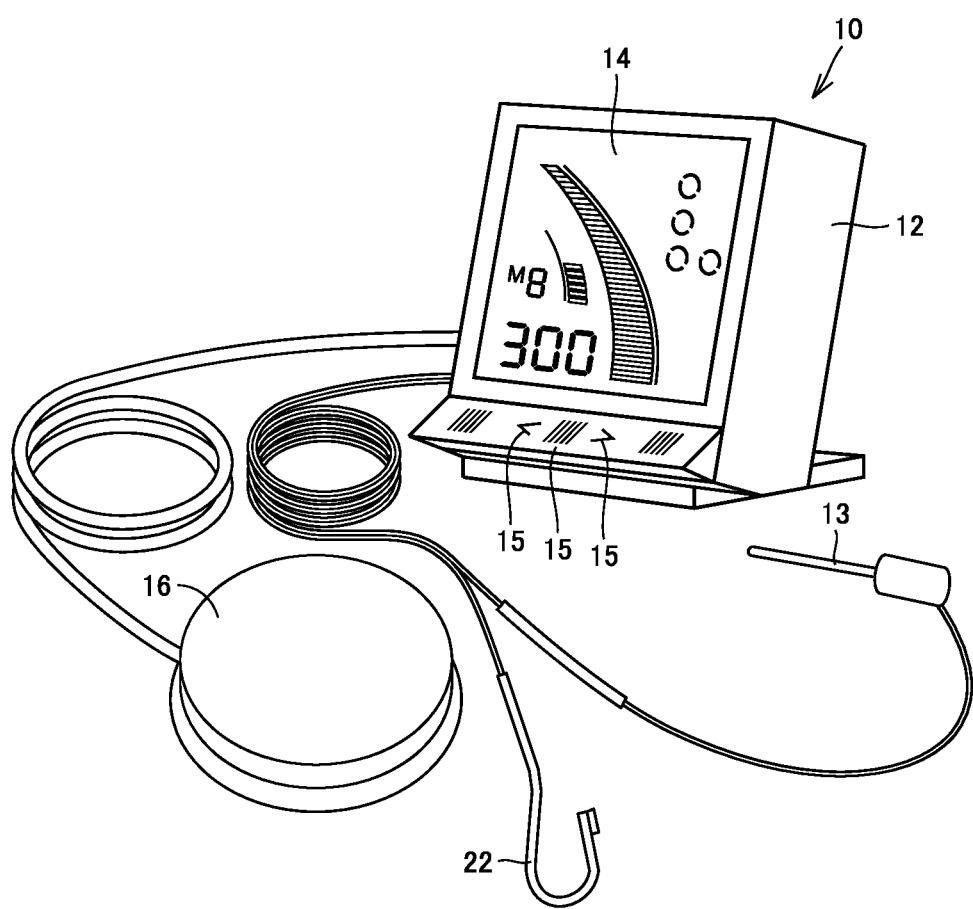
FIG. 1 is an external view of a dental treatment apparatus according to a first embodiment.
Figure 2:
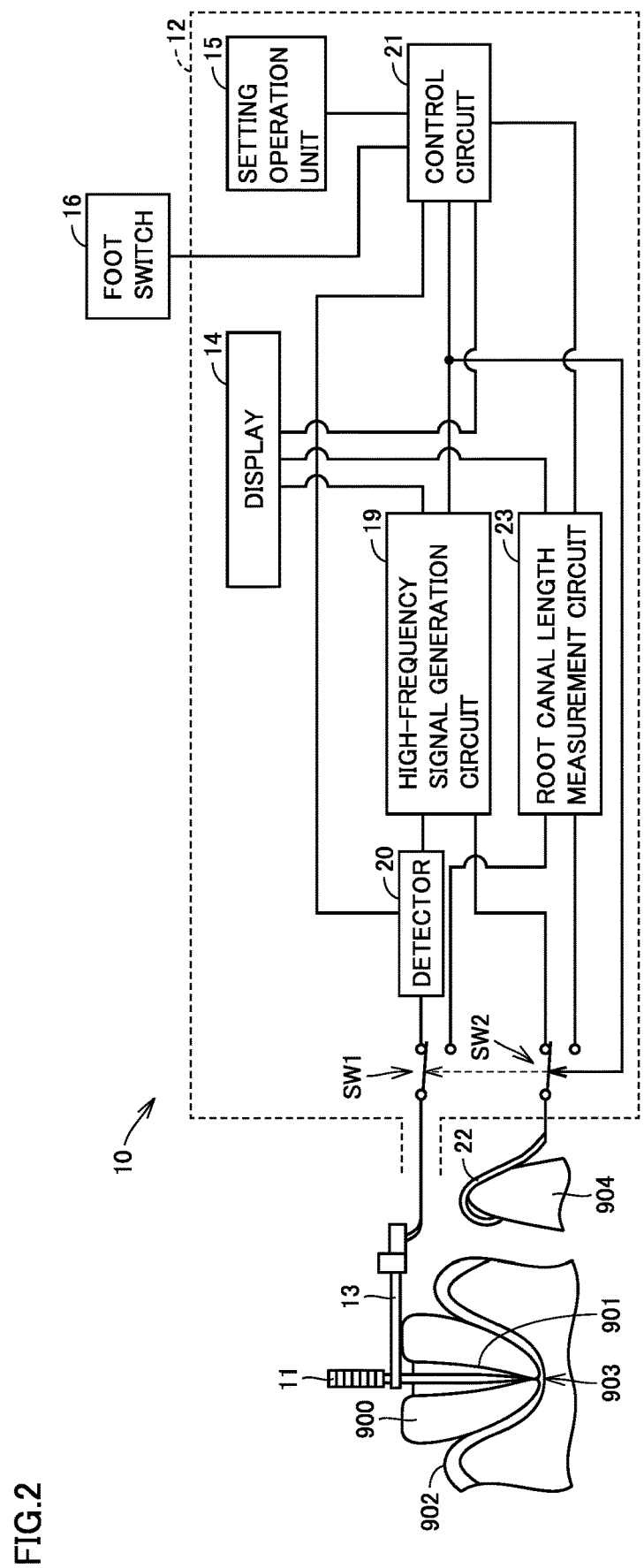
FIG. 2 is a block diagram of a configuration of the dental treatment apparatus according to the first embodiment.
Figure 3:
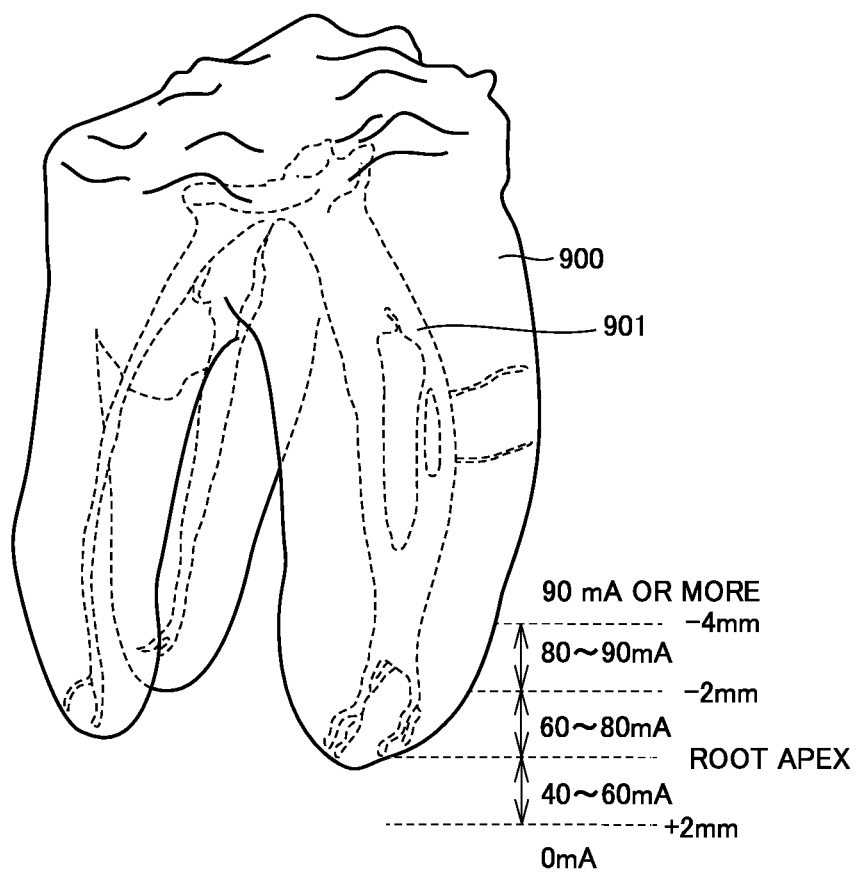
FIG. 3 is a diagram for schematically describing a root canal of a tooth.

FIG. 1 is an external view of a dental treatment apparatus according to a first embodiment. FIG. 2 is a block diagram of a configuration of the dental treatment apparatus according to the first embodiment. FIG. 3 is a diagram for schematically describing a root canal of a tooth. Root canal treatment of cutting and widening a root canal of a tooth is very difficult treatment because a degree to which a root canal is curved or a degree to which a root canal is calcified and blocked, and the like are different among individuals. A tooth 900 shown in FIG. 3 is a molar tooth, and each tooth includes a plurality of root canals 901. It is difficult to perform treatment on all such complex-shaped root canals. In particular, when there is a portion where it is difficult to cut and widen a root canal using cutting tools such as a reamer and a file, the root canal in the portion cannot be cut and widened, and dental pulp or an inflammation factor remains in the root canal, inflammation may occur after treatment.

Therefore, the dental treatment apparatus performs treatment in which an electrode is inserted into a root canal, and the electrode is energized with a high-frequency current. During this treatment, a human body, particularly a tooth, more particularly a root canal, a periodontal tissue, or a bone is energized with the high-frequency current, so that the energized portion, particularly a portion near the electrode and a portion having a high current density, is cauterized by Joule heat generated by the high-frequency current, reducing an inflammation factor, bacteria, and the like. Note that complete sterilization need not be achieved by this treatment, and it is sufficient that dental pulp or granulation can be thermally denatured to cause necrosis or deactivation. Further, this treatment is also referred to as electro-magnetic apical treatment (EMAT) and is disclosed in the literature (for example, Naoki Bando, Toshihiko Tominaga, Hiromichi Yumoto, Takashi Sumitomo, Saki Hirao, Koji Hirao, Takashi Matsuo, "Application of electro-magnetic wave irradiation for endodontic treatment-EMAT (electro-magnetic apical treatment)", 2011, The Journal of Japan Endodontic Association, vol. 32, pp. 184-200) and the like. This disclosure has reported that prognosis is extremely good because it is possible to reduce an inflammation factor, bacteria, and the like at the dental treatment site by energizing, with a high-frequency current, an affected part before and after treatment.

However, a part subjected to the root canal treatment includes hard tissue such as a tooth and soft tissue such as granulation, and even when energization with a high-frequency current having the same current value is performed, pain may be caused in soft tissue where nerves exist. In particular, in the vicinity of the root apex, there are many portions that should be prevented from suffering serious thermal damage from the clinical viewpoint and many soft tissue portions, and it is therefore necessary to pay special attention when such portions are energized with a high-frequency current as compared with the other portions.

Further, it is possible to apply anesthesia in order to reduce the pain caused by the energization, but, when anesthesia is applied in dental treatment, it will take about 10 minutes to 15 minutes until the effect of the anesthesia is exerted including a treatment time, which reduces treatment efficiency.

Furthermore, the closer the electrode is to the root apex, the more carefully the operation needs to be performed; therefore, in a dental treatment apparatus 10 according to a first embodiment, the possibility of destroying important tissue of the root apex is reduced by performing energization with an optimum current value in accordance with each electrode position or changing or stopping a current with which energization is performed. Specifically, as shown in FIG. 1, dental treatment apparatus 10 includes an energizing unit 12 that energizes, with a high-frequency current, a file 11 (see FIG. 2) that is a cutting tool, and a file holder 13 that holds file 11 and is capable of energizing, with the high-frequency current, to file 11 attached to a distal end of file holder 13. Note that, in the present disclosure, file 11 attached to the distal end of file holder 13 and serving as an electrode to be placed in a root canal will be described, but file holder 13 and file 11 may be integrated into a single unit.

File holder 13 is made of a substantially rod-shaped housing and is capable of holding a metal portion of file 11. File holder 13 can electrically connect the file and energizing unit 12 by holding the metal portion of file 11. Energizing unit 12 includes a display 14 and a setting operation unit 15 and is connected with a foot switch 16 and a passive electrode 22.

As shown in FIG. 2, energizing unit 12 includes a high-frequency signal generation circuit 19, a detector 20, a control circuit 21, a root canal length measurement circuit 23, and switches SW1, SW2 in addition to display 14 and setting operation unit 15. Energizing unit 12 causes root canal length measurement circuit 23 to measure the position of the distal end of file 11 and energizes file 11 with the high-frequency current having a current value in accordance with information on the measured position. Specifically, as shown in FIG. 3, energizing unit 12 presets the current value with which file 11 is energized to make, when the distal end of file 11 protrudes from the root apex by at least 2 mm (≤+2 mm), the current value equal to 0 mA (that is, the passage of current is stopped). Further, as shown in FIG. 3, energizing unit 12 presets the current value with which file 11 is energized to make, when the distal end of file 11 protrudes from the root apex by less than 2 mm (+2 mm to 0 mm), the current value greater than or equal to 40 mA and less than 60 mA. Furthermore, as shown in FIG. 3, energizing unit 12 presets the current value with which file 11 is energized to make, when the distal end of file 11 is located toward the crown relative to the root apex by 2 mm (0 mm to −2 mm), the current value greater than or equal to 60 mA and less than 80 mA. Further, as shown in FIG. 3, energizing unit 12 presets the current value with which file 11 is energized to make, when the distal end of file 11 is located toward the crown relative to the root apex by −2 mm to −4 mm, the current value greater than or equal to 80 mA and less than 90 mA. As shown in FIG. 3, energizing unit 12 presets the current value with which file 11 is energized to make, when the distal end of file 11 is located toward the crown relative to the root apex by less than or equal to −4 mm, the current value greater than or equal to 90 mA.

FIG. 3 shows an example where energizing unit 12 presets the current value with which file 11 is energized in accordance with a distance from the root apex to the distal end of file 11. Such positions are designated practically via output of a root canal length measurement device, but the present disclosure is not limited to such a configuration, and energizing unit 12 presets the current value with which file 11 is energized in accordance with a signal of the distal end of file 11 measured by root canal length measurement circuit 23 or a meter value of root canal length measurement circuit 23. Furthermore, energizing unit 12 may have a capability of adjusting, on an as-needed basis, the current value with which file 11 is energized to the preset current value in accordance with the position of the distal end of the file. It goes without saying that energizing unit 12 may have a capability of stopping energization of file 11 when the current value with which file 11 is energized deviates from the preset current value.

Hereinafter, a description will be given in detail of a configuration and control of energizing unit 12 that changes the energization with the optimum current value or the current with which energization is performed in accordance with the information on the position of the distal end of file 11.

Setting operation unit 15 includes setting buttons provided for setting how dental treatment apparatus 10 operates. Setting operation unit 15 allows the current value, frequency, energization period of the high-frequency current with which file 11 is energized, a display setting of display 14, and the like to be set in accordance with the position of the distal end of file 11. It goes without saying that these parameters are preset and changeable. Here, the energization period corresponds to a single energization period when the energization with the high-frequency current is performed one time in response to each operation and further corresponds to, when the energization with the high-frequency current is divided into a plurality of times and performed in response to each operation, the sum total of periods where the energization is divided into a plurality of times and performed.

Foot switch 16 is an operation unit provided to control the energization with the high-frequency current, and a control signal is transmitted from control circuit 21 to high-frequency signal generation circuit 19 when a user steps on foot switch 16. High-frequency signal generation circuit 19 energizes file 11 with the high-frequency current set via setting operation unit 15 based on the control signal received.

High-frequency signal generation circuit 19 passes the high-frequency current having, for example, a frequency of 300 kHz to 1000 kHz and a current value of 20 mA to 200 mA (a range of current values necessary for root canal treatment to reduce an inflammation factor, bacteria, and the like in the root canal) across file 11 and passive electrode 22. It goes without saying that the high-frequency current that can be generated by high-frequency signal generation circuit 19 is not limited to having the frequency and the current value described above. The current value, frequency, energization period, and the like of the high-frequency current output from high-frequency signal generation circuit 19 can be set and changed by operation of setting operation unit 15. Control circuit 21 controls high-frequency signal generation circuit 19 based on the current value detected by detector 20 so as to allow high-frequency signal generation circuit 19 to output the high-frequency current having the current value set via setting operation unit 15. Note that when control circuit 21 is configured not to control high-frequency signal generation circuit 19 based on the current value detected by detector 20, detector 20 need not be provided in dental treatment apparatus 10. Note that, when the energization with the high-frequency current is performed, file 11 is inserted into root canal 901, the distal end of file 11 is brought into contact with, for example, a tissue near a root apex 903, and passive electrode 22 is brought into contact with a part of a patient's body such as a gum 902 or lip 904. That is, file holder 13 is a holder that holds file 11 serving as an electrode placed in root canal 901, and high-frequency signal generation circuit 19 is a power supply that energizes the electrode with the high-frequency current.

Detector 20 is a current detector that detects a current value actually flowing through file 11 when the energization of file 11 with the high-frequency current is performed by high-frequency signal generation circuit 19. Control circuit 21 causes, based on the information on the position of the distal end of file 11 measured by root canal length measurement circuit 23, high-frequency signal generation circuit 19 to control the current value of the high-frequency current with which file 11 is energized. For example, control circuit 21 presets, in the form of a data table, an optimum current value predetermined in accordance with the information on the position of the distal end of file 11 by setting operation unit 15 and transmits a control signal of the current value of the high-frequency current to high-frequency signal generation circuit 19 in accordance with the data table. Note that the operator can change the information on the position of the distal end of file 11 and the optimum current value predetermined in the data table. Control circuit 21 includes, as hardware components, for example, a central processing unit (CPU), a storage that stores a program, data, and the like for causing the CPU to perform the processing, a random access memory (RAM) that serves as a work area of the CPU, a graphics processing unit (GPU) that primarily performs image processing, an input/output interface for maintaining consistency of signals exchanged with peripheral devices, and the like. The storage includes a storage device such as a non-volatile memory provided inside control circuit 21, a storage device connected over a network, or the like.

Root canal length measurement circuit 23 measures the position of the distal end of file 11 by applying a root canal length measurement signal across file 11 and passive electrode 22. The information on the position of the distal end of file 11 measured by root canal length measurement circuit 23 is transmitted from root canal length measurement circuit 23 to control circuit 21. Specifically, root canal length measurement circuit 23 applies voltages having two different frequencies across file 11 and passive electrode 22 to obtain respective impedance values, and determines the position of the distal end of file 11 relative to root apex 903 based on, for example, a difference or ratio between the two values (in practice, voltage or current values corresponding to the impedance values). Note that the method for measuring the root canal length is not limited to such a method, and various techniques including a measurement method proposed in the related art may be used. During the root canal length measurement, passive electrode 22 is also brought into contact with a part of the patient's body such as gum 902 or lip 904.

Switch SW1 is provided to switch the electrical connection between file 11 and high-frequency signal generation circuit 19 or root canal length measurement circuit 23. Switch SW2 is provided to switch the electrical connection between passive electrode 22 and high-frequency signal generation circuit 19 or root canal length measurement circuit 23.

Switch SW1 and switch SW2 are changes in position by control circuit 21 based on information input from setting operation unit 15. Specifically, in order to energize file 11 with the high-frequency current, control circuit 21 controls switch SW1 and switch SW2 to connect file 11 and passive electrode 22 to high-frequency signal generation circuit 19. In order to apply the root canal length measurement signal across file 11 and passive electrode 22, control circuit 21 controls switch SW1 and switch SW2 to connect file 11 and passive electrode 22 to root canal length measurement circuit 23. According to the first embodiment, switch SW1 and switch SW2 are controlled in accordance with an operation mode set via setting operation unit 15 to change connection destinations of file 11 and passive electrode 22. Note that switch SW1 and switch SW2 may be changed in position in synchronization with on/off operation of foot switch 16.

According to the first embodiment, high-frequency signal generation circuit 19 and root canal length measurement circuit 23 are electrically separated from each other by switch SW1 and switch SW2. Therefore, while high-frequency current is output to file 11, root canal length measurement circuit 23 is electrically disconnected from file 11 and passive electrode 22 by switch SW1 and switch SW2. This prevents root canal length measurement circuit 23 from being energized with the high-frequency current, so that it is possible to prevent root canal length measurement circuit 23 from failing due to the high-frequency current.

Further, according to the first embodiment, root canal length measurement circuit 23 is capable of finding the position of the distal end of file 11 relative to the root apex and transmits information on the position of the distal end of file 11 to control circuit 21. Therefore, when the user operates foot switch 16 after confirming the position of the distal end of file 11, dental treatment apparatus 10 switches the operation mode from a root canal length measurement mode to a sterilization mode (also referred to as a high-frequency energization mode) and energizes file 11 with the high-frequency current having the optimum current value at the position. Note that dental treatment apparatus 10 may receive, with no root canal length measurement circuit 23 provided in the housing, the information on the position of the distal end of file 11 measured by a root canal length measurement device provided in another housing and energize file 11 with the high-frequency current based on the information. Further, as an example of display, when the operation mode is the root canal length measurement mode, dental treatment apparatus 10 serves as a root canal length measurement device and displays the position of the distal end of file 11 on display 14. When the operation mode is the sterilization mode, dental treatment apparatus 10 serves as a high-frequency treatment device and displays the current value of the high-frequency current with which energization is being performed on display 14. That is, when the operation mode is the sterilization mode, display 14 serves as a high-frequency current meter device and can notify the user of the current value of the high-frequency current with which energization is being performed in real time to help hone the user's intuition during the treatment. When the information on the measured position of the distal end of file 11 in the root canal changes by at least a predetermined percentage due to the energization, control circuit 21 may determine that the root canal environment changes due to the energization and display information showing that the position of the distal end of file 11 changes abruptly on display 14.

Display 14 is, for example, a liquid crystal display and serves as a notification unit that outputs the current value with which file 11 is energized by high-frequency signal generation circuit 19, the position of the distal end of file 11 measured by root canal length measurement circuit 23, and the like to notify the user of dental treatment apparatus 10 of necessary information. For example, when the current value detected by detector 20 falls outside the range of current values necessary for the root canal treatment to reduce an inflammation factor, bacteria, and the like in the root canal, display 14 may output information showing that the current value of the high-frequency current with which the energization is performed falls outside the range of current values necessary for the root canal treatment. Note that display 14 may include an organic EL display, electronic paper, a light emitting diode, or the like. Further, the notification unit may be a lamp, a speaker, or the like (not shown) rather than display 14, and may output the notification to the user by turning on the lamp or by emitting a beep from a speaker.

As described above, dental treatment apparatus 10 according to the first embodiment is configured to energize the root canal with the high-frequency current. Dental treatment apparatus 10 includes file holder 13 that holds file 11 placed in the root canal, high-frequency signal generation circuit 19 that energizes file 11 with the high-frequency current, root canal length measurement circuit 23 that electrically measures the position of the distal end of file 11 in the root canal, and control circuit 21 that causes, based on the information on the position of the distal end of file 11 measured by root canal length measurement circuit 23, high-frequency signal generation circuit 19 to control the current value of the high-frequency current with which file 11 is energized.

With such a configuration, in dental treatment apparatus 10 according to the first embodiment, high-frequency signal generation circuit 19 is caused to control the current value of the high-frequency current with which file 11 is energized in accordance with the information on the position of the distal end of file 11 measured by root canal length measurement circuit 23, so that it is possible to perform energization with the high-frequency current having the optimum current value in accordance with the information on the position of the distal end of file 11 inserted into the root canal, thereby allowing an increase in treatment efficiency.

Furthermore, control circuit 21 may cause high-frequency signal generation circuit 19 to perform any one of control of not starting energization of file 11 with the high-frequency current, control of stopping the energization, or control of changing the current value with which the energization is performed in accordance with the information of the measured position of the distal end of file 11 in the root canal. This allows dental treatment apparatus 10 to perform optimum control such as stopping the energization with the high-frequency current under a situation where the distal end of file 11 is located outside the root canal, for example. On the other hand, when the distal end of the file is moved toward the crown, the current value automatically increases. Note that the control of not starting the energization of file 11 with the high-frequency current is control that is performed before the energization operation of file 11 with the high-frequency current to disable the energization of file 11 with the high-frequency current even when the operator performs the energization operation. On the other hand, the control of stopping the energization of file 11 with the high-frequency current is control that is performed during the energization of file 11 with the high-frequency current. With the energization stopped, the root canal length may be measured, and thus the energization of file 11 with high-frequency current is not performed.

Control circuit 21 has the root canal length measurement mode (first control mode) where root canal length measurement circuit 23 is controlled to electrically measure the position of the distal end of file 11 in the root canal by energizing file 11 with a measurement signal and the sterilization mode (second control mode) where high-frequency signal generation circuit 19 is controlled to energize file 11 with the high-frequency current. This allows dental treatment apparatus 10 to switch between the root canal length measurement mode and the sterilization mode to prevent root canal length measurement circuit 23 from failing due to the high-frequency current. For example, dental treatment apparatus 10 further includes foot switch 16 (operation unit) that receives a user's operation, and control circuit 21 switches, in response to the user's operation of foot switch 16, the control of high-frequency signal generation circuit 19 to the sterilization mode.

Control circuit 21 may measure the position of the distal end of file 11 in the root canal in the root canal length measurement mode, and cause, in the sterilization mode, high-frequency signal generation circuit 19 to energize file 11 with a current value within a predetermined range set based on the measured position of the distal end of file 11. This allows dental treatment apparatus 10 to bring the current value of the high-frequency current with which file 11 is energized within the predetermined range.

Control circuit 21 may display, on display 14, the measured position of the distal end of file 11 in the root canal. This allows dental treatment apparatus 10 to cause the user to recognize the position of the distal end of file 11.

Furthermore, dental treatment apparatus 10 further includes display 14 that notifies the user of information. Control circuit 21 may display, on display 14, one of the root canal length measurement mode and the sterilization mode that is enabled. This allows dental treatment apparatus 10 to cause the user to recognize the active operation mode.

When the measured position of the distal end of file 11 in the root canal satisfies a predetermined condition, control circuit 21 causes display 14 to output information showing that the predetermined condition is satisfied. When a condition where the measured position of the distal end of file 11 in the root canal changes by at least a predetermined percentage is satisfied as the predetermined condition, control circuit 21 causes display 14 to output information showing that the position of the distal end of file 11 changes abruptly. Further, when the current value detected by detector 20 falls outside the predetermined range, control circuit 21 may cause display 14 to output information showing that the current value of the high-frequency current with which energization is being performed falls outside the predetermined range. This allows dental treatment apparatus 10 to appropriately notify the user of the state of the high-frequency current with which energization is performed.

Second Embodiment

A description has been given of dental treatment apparatus 10 according to the first embodiment that energizes file 11 with the high-frequency current having the preset current value in the sterilization mode based on the information on the position of the distal end of file 11 measured in the root canal length measurement mode. As for a second embodiment, a description will be given in detail of how to control the current value of the high-frequency current with which file 11 is energized in the sterilization mode. Note that, according to the second embodiment, the same components as the components of dental treatment apparatus 10 described according to the first embodiment are denoted by the same reference numerals, and no detailed description of such components will be given below. Further, the contents of the first embodiment described above can be combined with contents of the second embodiment to the extent consistent with the second embodiment.

Figure 4:
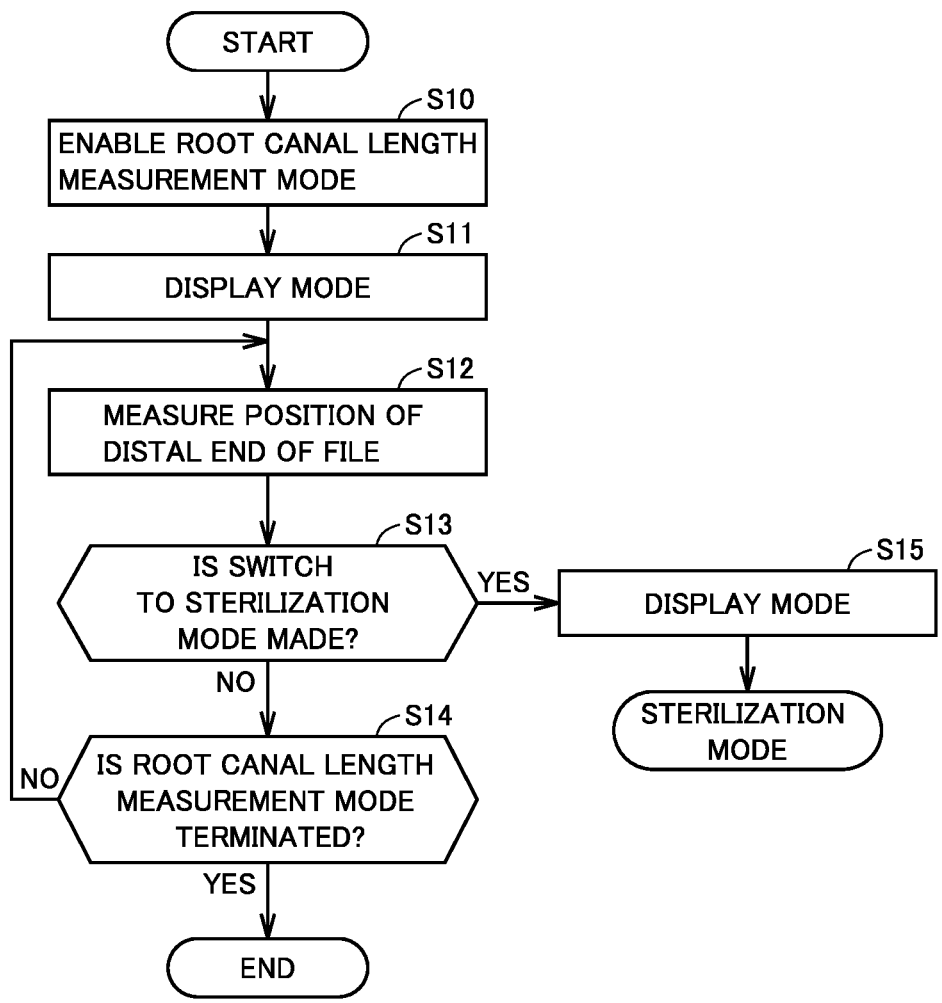
FIG. 4 is a flowchart for describing control of a dental treatment apparatus according to a second embodiment.
Figure 5:
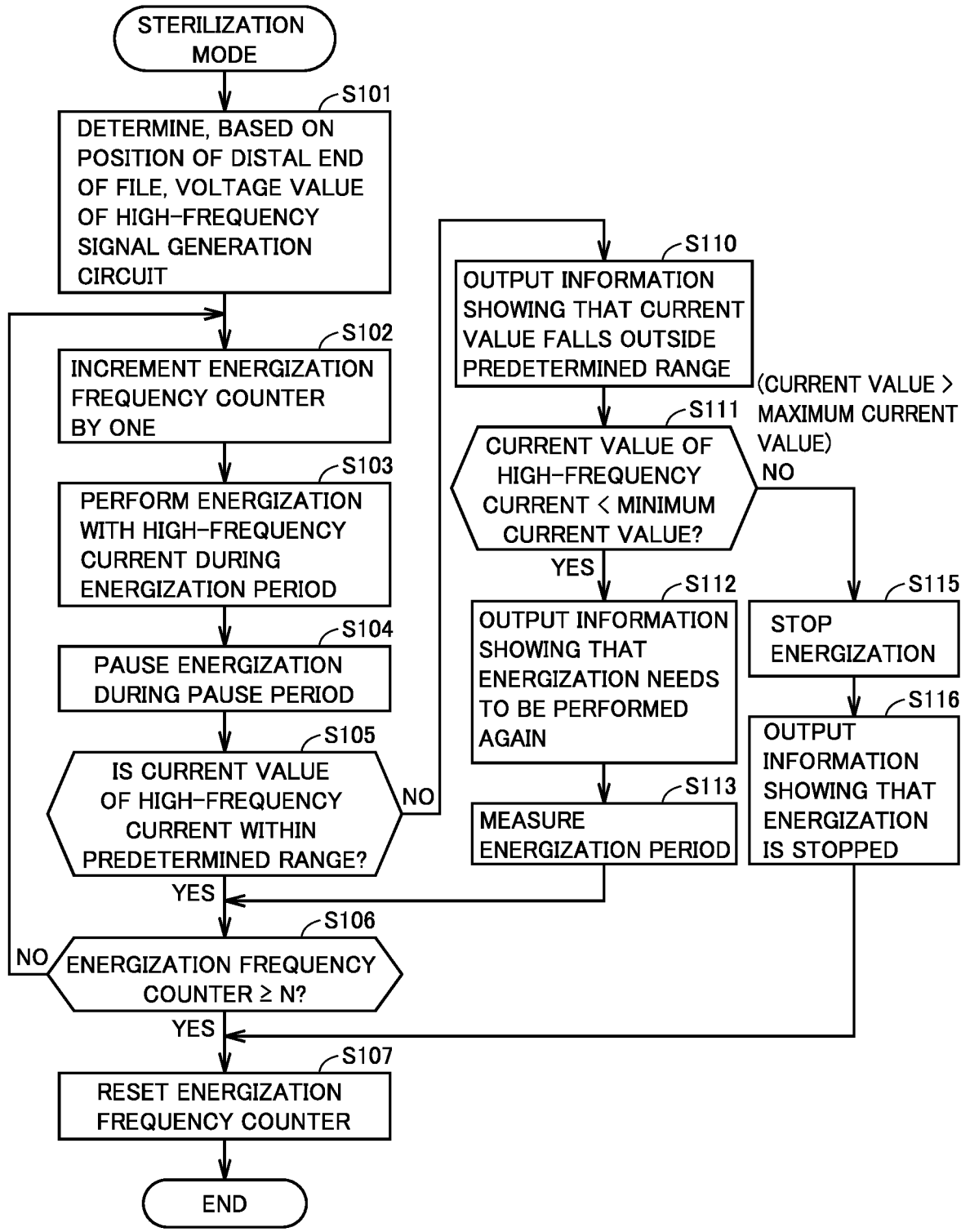
FIG. 5 is a flowchart for describing control, in a sterilization mode, of the dental treatment apparatus according to the second embodiment.

A description will be given with reference to a flowchart of the control of the current value of the high-frequency current with which file 11 is energized in dental treatment apparatus 10. FIG. 4 is a flowchart for describing control of a dental treatment apparatus according to a second embodiment. FIG. 5 is a flowchart for describing control, in a sterilization mode, of the dental treatment apparatus according to the second embodiment. First, the user puts dental treatment apparatus 10 into the root canal length measurement mode. Control circuit 21 enables the root canal length measurement mode as the operation mode (step S10). In order to notify the user of the operation mode to be enabled, control circuit 21 causes display 14 to output information showing that that the root canal length measurement mode is enabled (step S11).

Control circuit 21 instructs root canal length measurement circuit 23 to measure the position of the distal end of file 11 (step S12). Root canal length measurement circuit 23 starts the root canal length measurement based on a control signal from control circuit 21 to measure the position of the distal end of file 11 by applying the root canal length measurement signal across file 11 and passive electrode 22. Control circuit 21 determines whether to switch the operation mode to the sterilization mode (step S13). For example, control circuit 21 determines whether to switch the operation mode to the sterilization mode based on whether the user operates foot switch 16. Specifically, control circuit 21 determines to switch the operation mode to the sterilization mode when the user operates foot switch 16, and determines to maintain the root canal length measurement mode unless the user operates foot switch 16.

When determining not to switch the operation mode to the sterilization mode (NO in step S13), control circuit 21 determines whether an operation of terminating the root canal length measurement mode has been received (step S14). When the operation of terminating the root canal length measurement mode has not been received (NO in step S14), control circuit 21 returns the processing to step S12 and continues to operate in the root canal length measurement mode. On the other hand, when the operation of terminating the root canal length measurement mode has been received (YES in step S14), control circuit 21 terminates the root canal length measurement mode.

Returning to step S13, when determining that the operation mode is switched to the sterilization mode (YES in step S13), control circuit 21 causes display 14 to output information showing that the sterilization mode is enabled to notify the user of the operation mode to be enabled (step S15). Control circuit 21 displays the operation mode to be enabled in step S15 and starts a process in the sterilization mode.

Next, a description will be given of the process in the sterilization mode with reference to the flowchart of FIG. 5. Control circuit 21 determines, based on the information on the position of the distal end of file 11 received from root canal length measurement circuit 23, a voltage value of high-frequency signal generation circuit 19 that brings the current value of the high-frequency current with which file 11 is energized within the predetermined range (step S101).

In order to count the frequency of energization with the high-frequency current during the energization period, control circuit 21 increments an energization frequency counter by one (step S102). Control circuit 21 applies the voltage value determined in step S101 to high-frequency signal generation circuit 19 to cause high-frequency signal generation circuit 19 to energize file 11 with the current value within the predetermined range during the energization period (step S103). After the elapse of the energization period, control circuit 21 pauses the energization of file 11 by high-frequency signal generation circuit 19 during a pause period (step S104). Control circuit 21 determines whether the current value detected by detector 20 when the voltage value determined in step S101 is applied to high-frequency signal generation circuit 19 falls within the predetermined range (step S105).

When the detected current value falls within the predetermined range (YES in step S105), control circuit 21 determines whether the energization frequency counter is greater than or equal to N (for example, 10) (step S106). When the energization frequency counter is not greater than or equal to N (NO in step S106), control circuit 21 returns the processing to step S102 and repeats the control of the energization period and the pause period. On the other hand, when the energization frequency counter is greater than or equal to N (YES in step S106), control circuit 21 resets the energization frequency counter to 0 (zero) (step S107) and stops the process of energizing file 11 with the high-frequency current.

Returning to step S105, when the detected current value falls outside the predetermined range (NO in step S105), control circuit 21 displays, on display 14, information showing that the current value of the high-frequency current with which energization is performed falls outside the predetermined range (step S110). Specifically, when foreign matter in the root canal comes off during the energization of file 11 with the high-frequency current in the vicinity of the root apex, and the current value detected by detector 20 falls outside the predetermined range (40 mA to 60 mA) corresponding to the vicinity of the root apex and changes to 60 mA, 90 mA, and 80 mA, control circuit 21 may display a string "falls outside the predetermined range" on display 14 or change the background color of the screen to yellow. When a speaker is provided as the notification unit, the user may be notified, by a warning beep, of information showing that the current value of the high-frequency current with which energization is performed falls outside the predetermined range.

Next, even when the voltage value determined in step S101 is applied to high-frequency signal generation circuit 19, control circuit 21 determines whether the current value detected by detector 20 is less than the minimum current value of the predetermined range (step S111). When the detected current value falls outside the predetermined range (NO in step S105) and is less than the minimum current value of the predetermined range (YES in step S111), control circuit 21 displays, on display 14, information showing that the process of energizing file 11 with the high-frequency current needs to be performed again (step S112). Specifically, control circuit 21 possibly displays a string "re-energization" on display 14, or causes the screen to blink with the background color set to yellow. When a speaker is provided as the notification unit, the user may be notified, by a warning beep, of information showing that energization needs to be performed again.

Further, control circuit 21 measures the energization period where the detected current value is less than the minimum current value of the predetermined range (step S113). In the flowchart shown in FIG. 5, the process of energizing file 11 with the high-frequency current is stopped when the control of the energization period and the pause period has been repeated N times (for example, 10 times) rather than when the detected current value becomes less than the minimum current value of the predetermined range. Therefore, control circuit 21 can measure the energization period where the detected current value is less than the minimum current value of the predetermined range based on how many times the energization period where the detected current value is less than the minimum current value has appeared among the repetitions N. In order to perform energization again, control circuit 21 may perform, by measuring the energization period where the detected current value is less than the minimum current value, the energization only during the period measured in step S113. It goes without saying that, when the process of energizing file 11 with the high-frequency current is stopped when the detected current value becomes less than the minimum current value of the predetermined range, control circuit 21 may execute step S107 after step S113. Here, the case where the detected current value can be determined to be less than the minimum current value of the predetermined range corresponds to a case where the environment in the root canal changes during energization, the impedance of the root canal increases, and a current value less than the minimum current value of the predetermined range flows accordingly. Further, when the detected current value is less than the minimum current value of the predetermined range, control circuit 21 may perform control so as to increase the voltage applied to high-frequency signal generation circuit 19 to make the current value of the high-frequency current with which file 11 is energized greater than or equal to the minimum current value of the predetermined range.

Returning to step S111, when the detected current value falls outside the predetermined range (NO in step S105) and is not less than the minimum current value of the predetermined range (NO in step S111), control circuit 21 can determine that the detected current value is greater than the maximum current value of the predetermined range, and thus stops the process of energizing file 11 with the high-frequency current (step S115). Control circuit 21 displays, on display 14, information showing that the process of energizing file 11 with the high-frequency current is stopped (step S116). Specifically, control circuit 21 possibly displays a string "stop" on display 14 or causes the screen to blink with the background color set to red. When a speaker is provided as the notification unit, the user may be notified, by a warning beep, of information showing that energization is stopped. Here, the case where the detected current value can be determined to be greater than the maximum current value of the predetermined range corresponds to a case where the environment in the root canal changes during energization, the impedance of the root canal decreases, and a current value greater than the maximum current value of the predetermined range flows accordingly, or a case where the impedance of the root canal is already low during the first energization. Further, when the detected current value is greater than the maximum current value of the predetermined range, control circuit 21 may perform control so as to decrease the voltage applied to high-frequency signal generation circuit 19 to make the current value of the high-frequency current with which file 11 is energized less than or equal to the maximum current value of the predetermined range.

Figure 6:
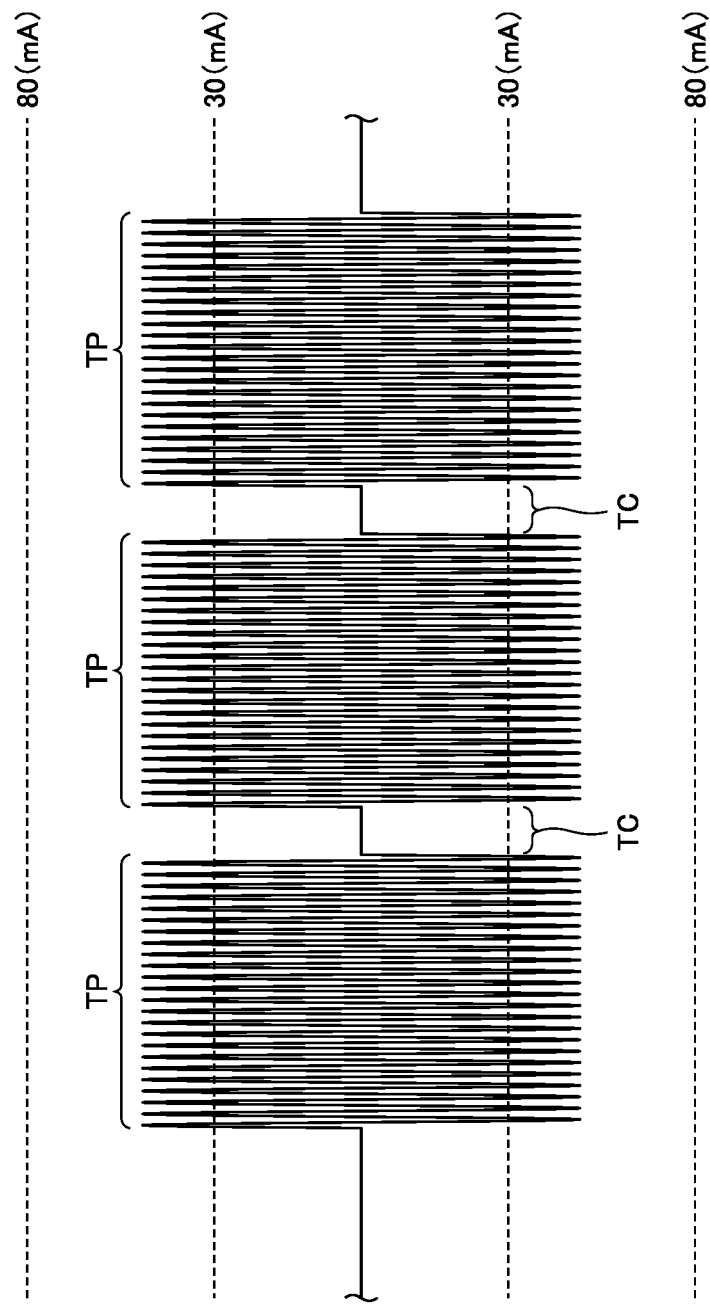
FIG. 6 is a diagram showing a waveform of a current with which an electrode of the dental treatment apparatus according to the second embodiment is energized.

Next, a description will be given of a waveform of the high-frequency current with which file 11 is energized by high-frequency signal generation circuit 19. FIG. 6 is a diagram showing a waveform of a current with which an electrode of the dental treatment apparatus according to the second embodiment is energized. When the user operates foot switch 16 at the energization position of the high-frequency current based on the display of root canal length measurement circuit 23, dental treatment apparatus 10 causes high-frequency signal generation circuit 19 to energize file 11 with the high-frequency current having the current value corresponding to the energization position with the waveform shown in FIG. 6.

High-frequency signal generation circuit 19 passes, during an energization period (TP) shown in FIG. 6, the high-frequency current corresponding to the position of the distal end of the file within a range of current values (for example, 30 mA to 80 mA) necessary for the root canal treatment to reduce an inflammation factor, bacteria, and the like in the root canal. Note that the diagram shown in FIG. 6 is a schematic representation, and a wavenumber shown in the diagram is different from the actual high-frequency wavenumber. Hereinafter, the same applies to a high-frequency waveform. That is, control circuit 21 causes high-frequency signal generation circuit 19 to energize file 11 with the high-frequency current having the optimum current value predetermined in accordance with the information on the position of the distal end of file 11 during the energization period.

High-frequency signal generation circuit 19 performs energization for 0.07 seconds (70 ms), for example, as the energization period, and then pauses the energization for 0.03 seconds (30 ms), for example, as a pause period (TC). Furthermore, high-frequency signal generation circuit 19 repeats the second period and the pause period (0.1 seconds (100 ms) in total) N times (for example, 10 times) for each energization (for example, each operation of foot switch 16). Dental treatment apparatus 10 causes, each time the user steps on foot switch 16, high-frequency signal generation circuit 19 to energize file 11 with the high-frequency current for about 1 second (including the pause period). Note that, according to the second embodiment, the energization period corresponds to a total period where the second period and the pause period are repeated N times (for example, 10 times). Note that the number of repetitions of the second period and the pause period can be preset by the user using setting operation unit 15, and is set to, for example, 10 times according to the second embodiment. It goes without saying that the number of repetitions of the second period and the pause period may be set to a value other than 10 times. Further, in setting operation unit 15, instead of being set as the number of repetitions of the second period and the pause period, it may be set as the energization period (for example, 1 second).

High-frequency signal generation circuit 19 may perform feedback control so as to maintain the current value of the high-frequency current determined in step S101 during the energization period. Specifically, when high-frequency signal generation circuit 19 includes a constant voltage circuit and energizes file 11 with the high-frequency current under constant voltage control, high-frequency signal generation circuit 19 controls the high-frequency voltage to be applied during the second period based on the current value detected by detector 20 to cause file 11 to be energized with the determined current value of the high-frequency current. It goes without saying that high-frequency signal generation circuit 19 may include a constant current circuit and perform control so as to energize file 11 with the current value of the high-frequency current determined under constant current control.

Figure 7:
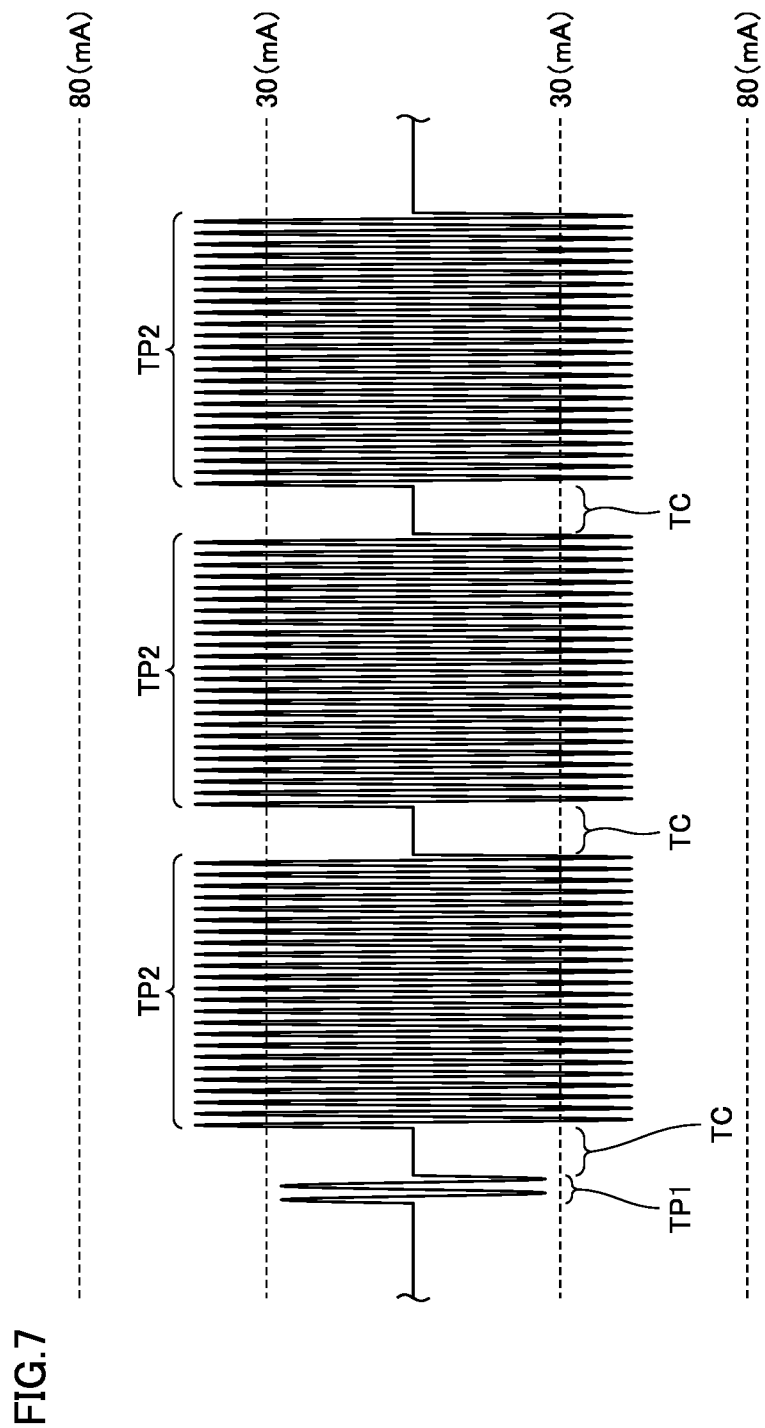
FIG. 7 is a diagram showing a waveform of a current with which an electrode of a dental treatment apparatus according to a modification of the second embodiment is energized.

Further, control circuit 21 may perform control so as to energize file 11 with a preliminary current before the start of energization with the current value of the high-frequency current determined in step S101 to bring the current value of the high-frequency current with which file 11 is energized within the predetermined range. FIG. 7 is a diagram showing a waveform of a current with which an electrode of a dental treatment apparatus according to a modification of the second embodiment is energized. Energization during a first period (TP1) shown in FIG. 7 is preliminary energization, and a voltage for obtaining the current value within the predetermined range preset based on the information on the position of the distal end of file 11 is determined from the current value obtained by the preliminary energization, and the voltage is output, so that energization can be performed with the high-frequency current determined in step S101 during the subsequent second period (TP2). When high-frequency signal generation circuit 19 energizes file 11 with the high-frequency current under constant voltage control, a high-frequency voltage lower than the high-frequency voltage applied during the second period is applied during the first period, so that an excessive current does not flow during the first period where the optimum output voltage is determined. As a result, it is possible to perform energization, during the first period, with a current value smaller than the current value with which energization is performed during the second period. It goes without saying that a difference need not be provided between the current value with which energization is performed during the first period and the current value with which energization is performed during the second period.

When it is assumed that a path extending from file 11 to passive electrode 22 has a normal impedance, control circuit 21 controls the voltage of high-frequency signal generation circuit 19 so as to energize file 11 with the current value of the preliminary current. Then, when a preliminary voltage is applied to cause high-frequency signal generation circuit 19 to energize file 11 with the preliminary current, and the impedance of the path extending from file 11 to passive electrode 22 changes from the normal impedance, the current value detected by detector 20 becomes different from an expected current value of the preliminary current. The impedance of the path extending from file 11 to passive electrode 22 varies in a manner that depends on the presence or absence of the insulating film formed on the surface of file 11, the presence or absence of adhesion of blood, protein, and the like to the surface of file 11, the impedance of the root canal, or the like.

Control circuit 21 determines a voltage for obtaining the current value within the predetermined range preset based on the information on the position of the distal end of file 11 by calculating a difference or a ratio between a predicted current value of the preliminary current and the current value detected by detector 20 and outputs the voltage to make the current value of the high-frequency current flowing from high-frequency signal generation circuit 19 to file 11 in the energization during the second period equal to the current value determined in step S101. That is, when the difference between the predicted current value of the preliminary current and the current value detected by detector 20 is large, control circuit 21 performs control so as to increase the voltage applied to high-frequency signal generation circuit 19 to make the current value of the high-frequency current flowing through file 11 equal to the current value determined in step S101. On the other hand, when the difference between the predicted current value of the preliminary current and the current value detected by detector 20 is small, control circuit 21 performs control so as to decrease the voltage applied to high-frequency signal generation circuit 19 to make the current value equal to the current value determined in step S101. Note that control circuit 21 may cause high-frequency signal generation circuit 19 to apply the preliminary voltage to file 11, calculate a value corresponding to the impedance of the root canal from the current detected by detector 20, and determine, based on the value, a voltage to be applied during the subsequent period.

When the current value of the high-frequency current is feedback-controlled during the energization period, and the current value detected by detector 20 changes and falls outside the predetermined range, control circuit 21 may display information showing that the current value falls outside the predetermined range on display 14. Specifically, when foreign matter in the root canal comes off during the energization of file 11 with the high-frequency current in the vicinity of the root apex, and the current value detected by detector 20 falls outside the predetermined range (40 mA to 60 mA) corresponding to the vicinity of the root apex and changes to 60 mA, 90 mA, and 80 mA, display 14 may output a warning display showing that the current value falls outside the predetermined range. Note that when the current value detected by detector 20 falls within the predetermined range but changes by at least a predetermined percentage (for example, about ±30%), information showing that the current value of the high-frequency current with which energization is performed changes abruptly may be displayed on display 14. It goes without saying that, when the current value falls outside the predetermined range, control circuit 21 may control the voltage to be applied to high-frequency signal generation circuit 19 so as to bring the current value of the high-frequency current with which file 11 is energized within the predetermined range.

As described above, in dental treatment apparatus 10 according to the second embodiment, control circuit 21 may cause high-frequency signal generation circuit 19 to control the current value of the high-frequency current with which file 11 is energized by determining, based on the current value detected by detector 20, a voltage that allows the current value within the predetermined range preset based on the position of the distal end to be output. This allows dental treatment apparatus 10 to perform treatment without giving a burden or uncomfortable feeling to the patient.

Furthermore, when a current value greater than the maximum current value of the predetermined range is detected by detector 20, control circuit 21 may cause high-frequency signal generation circuit 19 to control any one of the control of not starting energization of file 11 with the high-frequency current, the control of stopping the energization, or the control of changing the current value with which the energization is performed. This allows dental treatment apparatus 10 to perform treatment without giving a burden or uncomfortable feeling to the patient.

Furthermore, when a current value greater than the maximum current value of the predetermined range is detected by detector 20, and the energization of file 11 with the high-frequency current by high-frequency signal generation circuit 19 is stopped, control circuit 21 may cause display 14 to output information showing that the energization with the high-frequency current is stopped. This allows dental treatment apparatus 10 to cause the user to easily understand the cause of the stop of the energization with the high-frequency current.

Further, when a current value less than the minimum current value of the predetermined range is detected by detector 20, control circuit 21 may cause display 14 to output information showing that the energization with the high-frequency current needs to be performed again. This allows dental treatment apparatus 10 to notify the user of information showing that the dental treatment site is not sufficiently sterilized or the like.

Further, control circuit 21 may measure a period where a current value less than the minimum current value of the predetermined range is detected by detector 20 and cause display 14 to output the measured period. This allows dental treatment apparatus 10 to notify the user of how long file 11 needs to be further energized with the high-frequency current to sufficiently sterilize the dental treatment site.

Third Embodiment

A description has been given of dental treatment apparatus 10 according to the first embodiment that energizes file 11 with the high-frequency current having the current value preset based on the information on the position of the distal end of file 11 measured in the root canal length measurement mode. As for a dental treatment apparatus according to a third embodiment, a description will be given of a configuration where an energization period where the file is energized with the high-frequency current is controlled based on not only the information on the position of the distal end of file 11 measured in the root canal length measurement mode but also information on the position of the distal end of file 11 measured during the pause period. Note that, according to the third embodiment, the same components as the components of dental treatment apparatus 10 described according to the first embodiment are denoted by the same reference numerals, and no detailed description of such components will be given below. Further, the contents of the first embodiment described above can be combined with contents of the third embodiment to the extent consistent with the third embodiment.

Figure 8:
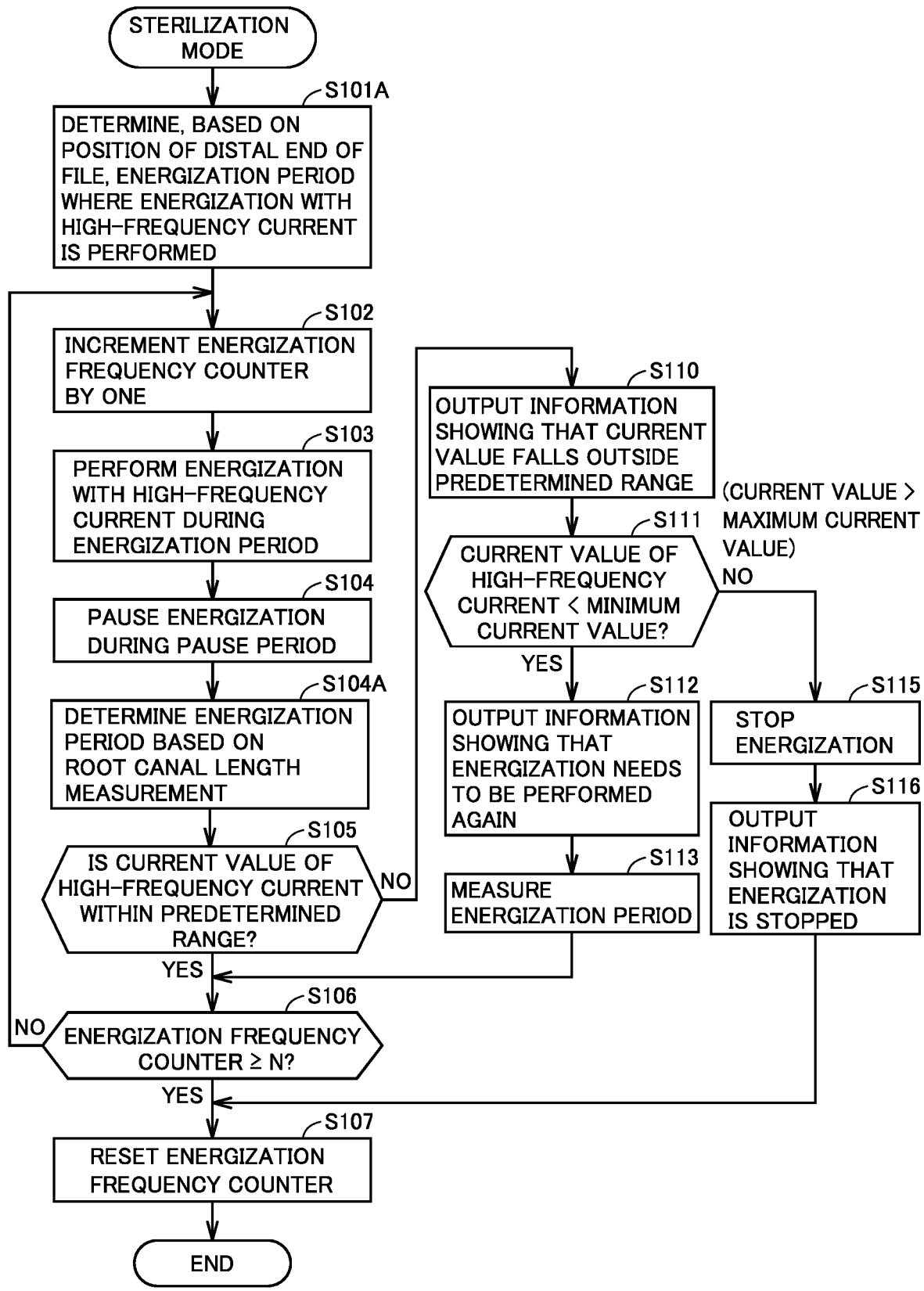
FIG. 8 is a flowchart for describing control, in the sterilization mode, of a dental treatment apparatus according to a third embodiment.

A description will be given with reference to a flowchart of how to control the energization period where file 11 is energized with the high-frequency current in dental treatment apparatus 10. FIG. 8 is a flowchart for describing control of the dental treatment apparatus according to the third embodiment. First, as shown in FIG. 4, the user puts dental treatment apparatus 10 into the root canal length measurement mode. Step S10 to step S15 are the same as shown in FIG. 4, and thus no detailed description will be given below of step S10 to step S15.

Next, control circuit 21 determines, based on the information on the position of the distal end of file 11 received from root canal length measurement circuit 23, the energization period where file 11 is energized with the high-frequency current (step S101A). Specifically, for example, control circuit 21 determines the energization period of the high-frequency current as follows: the further the distal end of file 11 is located away from the root apex, the longer the energization period, and the closer the distal end of file 11 is located to the root apex, the shorter the energization period.

In order to count the frequency of energization with the high-frequency current during the energization period, control circuit 21 increments an energization frequency counter by one (step S102). Control circuit 21 causes high-frequency signal generation circuit 19 to energize file 11 with the high-frequency current during the energization period determined in step S101A (step S103). After the elapse of the energization period, control circuit 21 pauses the energization of file 11 by high-frequency signal generation circuit 19 during a pause period (step S104). During the pause period, control circuit 21 switches the operation mode from the sterilization mode to the root canal length measurement mode, causes root canal length measurement circuit 23 to measure the position of the distal end of file 11 in the root canal, and determines the energization period based on the information of the measured position of the distal end of file 11 (step S104A). Note that control circuit 21 may stop the energization of file 11 with the high-frequency current in accordance with the information on the position of the distal end of file 11 measured during the pause period. For example, when the position of the distal end of file 11 measured during the pause period is located outside the root canal, control circuit 21 stops the energization of file 11 with the high-frequency current. When the energization of file 11 with the high-frequency current is stopped in accordance with the information on the position of the distal end of file 11, dental treatment apparatus 10 displays the fact on display 14 to cause the user to recognize that the energization with the high-frequency current is stopped.

Next, control circuit 21 causes the high-frequency current to flow through file 11 and determines whether the current value detected by detector 20 falls within the predetermined range (step S105). When the detected current value falls within the predetermined range (YES in step S105), control circuit 21 determines whether the energization frequency counter is greater than or equal to N (for example, 10) (step S106). When the energization frequency counter is not greater than or equal to N (NO in step S106), control circuit 21 returns the processing to step S102, switches the operation mode from root canal length measurement mode to sterilization mode, and repeats the control of the energization period and the pause period. When returning the processing to step S101, control circuit 21 provides a pause period (not shown). On the other hand, when the energization frequency counter is greater than or equal to N (YES in step S106), control circuit 21 resets the energization frequency counter to 0 (zero) (step S107) and stops the process of energizing file 11 with the high-frequency current.

Returning to step S105, when the detected current value falls outside the predetermined range (NO in step S105), control circuit 21 displays, on display 14, information showing that the current value of the high-frequency current with which energization is performed falls outside the predetermined range (step S110).

Next, control circuit 21 energizes file 11 with the high-frequency current and determines whether the current value detected by detector 20 is less than the minimum current value of the predetermined range (step S111). When the detected current value falls outside the predetermined range (NO in step S105) and is less than the minimum current value of the predetermined range (YES in step S111), control circuit 21 displays, on display 14, information showing that the process of energizing file 11 with the high-frequency current needs to be performed again (step S112).

Further, control circuit 21 measures the energization period where the detected current value is less than the minimum current value of the predetermined range (step S113). Further, when the detected current value is less than the minimum current value of the predetermined range, control circuit 21 may perform control so as to increase the voltage applied to high-frequency signal generation circuit 19 to make the current value of the high-frequency current with which file 11 is energized greater than or equal to the minimum current value of the predetermined range.

Returning to step S111, when the detected current value falls outside the predetermined range (NO in step S105) and is not less than the minimum current value of the predetermined range (NO in step S111), control circuit 21 can determine that the detected current value is greater than the maximum current value of the predetermined range, and thus stops the process of energizing file 11 with the high-frequency current (step S115). Control circuit 21 displays, on display 14, information showing that the process of energizing file 11 with the high-frequency current is stopped (step S116). Further, when the detected current value is greater than the maximum current value of the predetermined range, control circuit 21 may perform control so as to decrease the voltage applied to high-frequency signal generation circuit 19 to make the current value of the high-frequency current with which file 11 is energized less than or equal to the maximum current value of the predetermined range.

Figure 9:
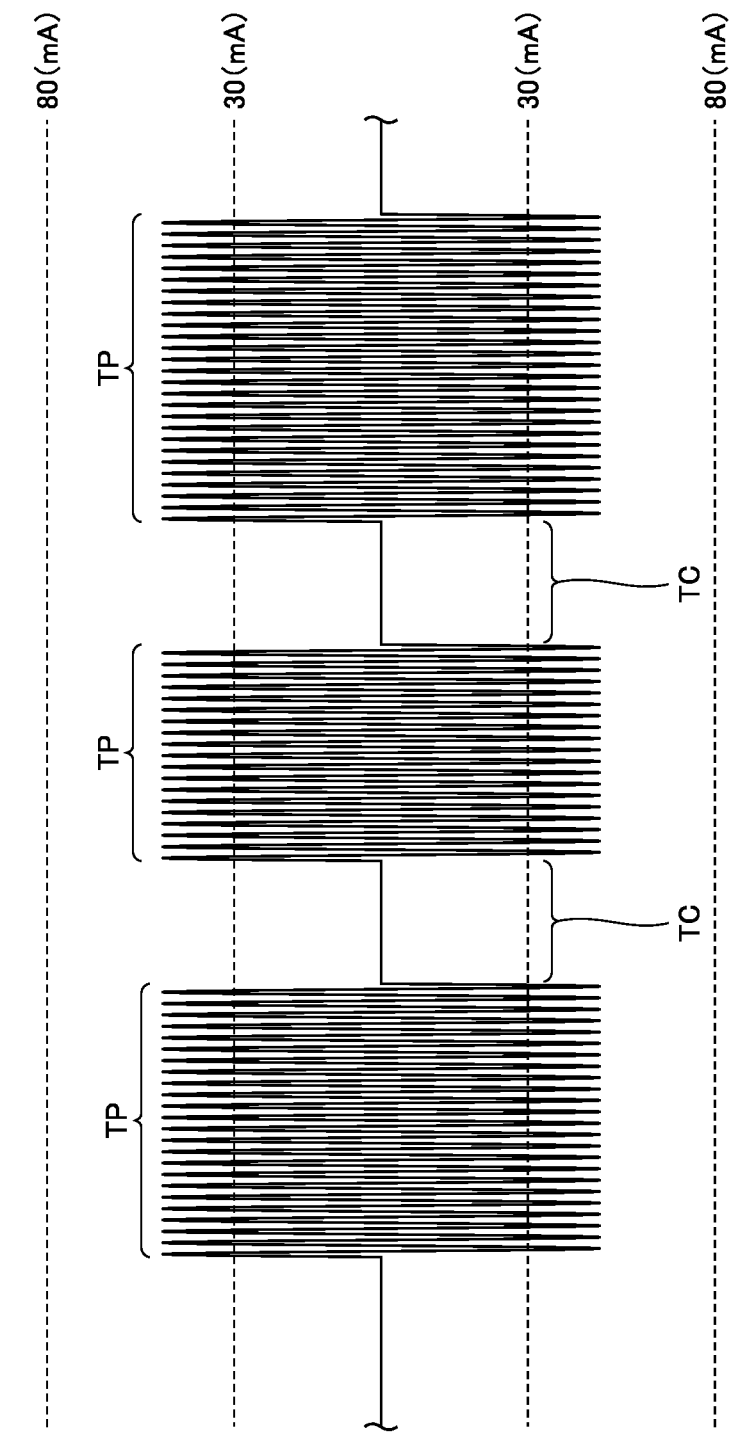
FIG. 9 is a diagram showing a waveform of a current with which an electrode of the dental treatment apparatus according to the third embodiment is energized.

FIG. 9 is a diagram showing a waveform of a current with which an electrode of the dental treatment apparatus according to the third embodiment is energized. In FIG. 9, the energization period and the pause period are repeatedly provided. Then, dental treatment apparatus 10 determines the length of the energization period based on the information on the position of the distal end of file 11 measured during the pause period before the start of energization during the energization period.

As shown in FIG. 9, dental treatment apparatus 10 determines the energization period where file 11 is energized with the high-frequency current every time based on the information on the position of the distal end of file 11 measured during the pause period, so that the energization period of the high-frequency current differs among the first energization period, the second energization period, and the third energization period. That is, in dental treatment apparatus 10, file 11 is energized with the high-frequency current having a waveform as shown in FIG. 9, so that it is possible to control the optimum energization period based on the information on the position of the distal end of file 11. It goes without saying that dental treatment apparatus 10 may make DUTY change where a ratio between energization period TP and pause period TC is changed with the sum of energization period TP and pause period TC made constant.

As described above, in dental treatment apparatus 10 according to the third embodiment, control circuit 21 causes high-frequency signal generation circuit 19 to control the period where file 11 is energized with the high-frequency current having the current value within the predetermined range in accordance with the information on the measured position of the distal end of file 11 in the root canal. With such a configuration, dental treatment apparatus 10 according to the third embodiment can energize file 11 with the high-frequency current during the energization period optimum for the information on the measured position of the distal end of file 11 in the root canal.

Further, control circuit 21 may switch the control of high-frequency signal generation circuit 19 to the root canal length measurement mode during the pause period between the energization period where file 11 is energized with the high-frequency current and the energization period where file 11 is energized with the high-frequency current next. This causes dental treatment apparatus 10 to switch the mode to the root canal length measurement mode during the pause period where energization with the high-frequency current is not performed and cause root canal length measurement circuit 23 to electrically measure the position of the distal end of file 11 in the root canal, so that it is possible to prevent root canal length measurement circuit 23 from failing due to the high-frequency current.

Note that a description has been given of the configuration according to the third embodiment where the energization period where the file is energized with the high-frequency current is controlled based on the information on the position of the distal end of file 11 measured during the pause period, but the configuration according to the third embodiment thus described may be combined, as needed, with a configuration where the current value of the high-frequency current with which file 11 is energized is controlled based on the information on the position of the distal end of file 11.

Fourth Embodiment

A description has been given of dental treatment apparatus 10 according to the first embodiment that energizes file 11 with the high-frequency current having the current value preset based on the information on the position of the distal end of file 11 measured in the root canal length measurement mode. As for a dental treatment apparatus according to a fourth embodiment, a description will be given of a configuration where at least either the current value of the high-frequency current with which the file is energized or the energization period is controlled based on the information on the position of the distal end of file 11 measured in the root canal length measurement mode. Note that, according to the fourth embodiment, the same components as the components of dental treatment apparatus 10 described according to the first embodiment are denoted by the same reference numerals, and no detailed description of such components will be given below. Further, the contents of the first embodiment described above can be combined with contents of the fourth embodiment to the extent consistent with the fourth embodiment.

Next, a description will be given with reference to a flowchart of control based on the product of the current value and energization period of the high-frequency current with which file 11 is energized in dental treatment apparatus 10. FIG. 10 is a flowchart for describing control of the dental treatment apparatus according to the fourth embodiment. First, as shown in FIG. 4, the user puts dental treatment apparatus 10 into the root canal length measurement mode. Step S10 to step S15 are the same as shown in FIG. 4, and thus no detailed description will be given below of step S10 to step S15.

Next, control circuit 21 determines, based on the information on the position of the distal end of file 11 received from root canal length measurement circuit 23, the voltage value of high-frequency signal generation circuit 19 that allows file 11 to be energized with the current value of the high-frequency current within the predetermined range and the energization period (step S101B). Control circuit 21 can determine at least either the length of the energization period and the current value of the high-frequency current with which energization is performed during the energization period by determining a value of a product of the current value of the high-frequency current and the energization period. Note that the current value of the high-frequency current with which energization is performed is controlled to be within the predetermined range. Specifically, in order to sterilize the root canal, it is necessary to perform energization with the high-frequency current having the current value within the predetermined range during a predetermined period. For example, the root canal can be sterilized when file 11 is energized with a high-frequency current of 30 mA for 1 second. Therefore, control circuit 21 determines the current value of the high-frequency current and the energization period necessary for sterilization of the root canal from the product of the current value of the high-frequency current and the energization period determined in accordance with the information on the position of the distal end of file 11. It goes without saying that control circuit 21 may determine either the current value of the high-frequency current with which file 11 is energized or the energization period based on the product of the current value of the high-frequency current and the energization period determined in accordance with the information on the position of the distal end of file 11. For example, the energization period is predetermined, and control circuit 21 determines only the current value of the high-frequency current with which file 11 is energized based on the product of the detected current value and the energization period.

In order to count the frequency of energization with the high-frequency current during the energization period, control circuit 21 increments an energization frequency counter by one (step S102). Control circuit 21 causes high-frequency signal generation circuit 19 to energize file 11 with the high-frequency current having the current value during the energization period, the current value and the energization period being determined in step S101B (step S103). After the elapse of the energization period, control circuit 21 pauses the energization of file 11 by high-frequency signal generation circuit 19 during a pause period (step S104). Control circuit 21 causes the high-frequency current to flow through file 11 and determines whether the current value detected by detector 20 falls within the predetermined range (step S105).

When the detected current value falls within the predetermined range (YES in step S105), control circuit 21 determines whether the energization frequency counter is greater than or equal to N (for example, 10) (step S106). When the energization frequency counter is not greater than or equal to N (NO in step S106), control circuit 21 returns the processing to step S102 and repeats the control of the energization period and the pause period. On the other hand, when the energization frequency counter is greater than or equal to N (YES in step S106), control circuit 21 resets the energization frequency counter to 0 (zero) (step S107) and stops the process of energizing file 11 with the high-frequency current.

Returning to step S105, when the detected current value falls outside the predetermined range (NO in step S105), control circuit 21 displays, on display 14, information showing that the current value of the high-frequency current with which energization is performed falls outside the predetermined range (step S110).

Next, control circuit 21 energizes file 11 with the high-frequency current and determines whether the current value detected by detector 20 is less than the minimum current value of the predetermined range (step S111). When the detected current value falls outside the predetermined range (NO in step S105) and is less than the minimum current value of the predetermined range (YES in step S111), control circuit 21 displays, on display 14, information showing that the process of energizing file 11 with the high-frequency current needs to be performed again (step S112).

Further, control circuit 21 measures the energization period where the detected current value is less than the minimum current value of the predetermined range (step S113). Further, when the detected current value is less than the minimum current value of the predetermined range, control circuit 21 may perform control so as to increase the voltage applied to high-frequency signal generation circuit 19 to make the current value of the high-frequency current with which file 11 is energized greater than or equal to the minimum current value of the predetermined range.

Returning to step S111, when the detected current value falls outside the predetermined range (NO in step S105) and is not less than the minimum current value of the predetermined range (NO in step S111), control circuit 21 can determine that the detected current value is greater than the maximum current value of the predetermined range, and thus stops the process of energizing file 11 with the high-frequency current (step S115). Control circuit 21 displays, on display 14, information showing that the process of energizing file 11 with the high-frequency current is stopped (step S116). Further, when the detected current value is greater than the maximum current value of the predetermined range, control circuit 21 may perform control so as to decrease the voltage applied to high-frequency signal generation circuit 19 to make the current value of the high-frequency current with which file 11 is energized less than or equal to the maximum current value of the predetermined range.

As described above, in dental treatment apparatus 10 according to the fourth embodiment, control circuit 21 causes high-frequency signal generation circuit 19 to control at least either the current value of the high-frequency current with which file 11 is energized or the period where file 11 is energized with the high-frequency current so as to have the value of the product of the current value and the period where energization with the high-frequency current is performed determined in accordance with the information on the measured position of the distal end of file 11 in the root canal. With such a configuration, dental treatment apparatus 10 according to the fourth embodiment can energize file 11 with the high-frequency current so as to have the value of the product of the current value and the period where energization with the high-frequency current is performed optimum for the information on the measured position of the distal end of file 11 in the root canal.

Note that the fourth embodiment may also be combined, as needed, with the described configuration according to the third embodiment to allow at least either the current value of the high-frequency current with which the file is energized or the energization period to be controlled based on the information on the position of the distal end of the 11 measured during the pause period.

MODIFICATION

The dental treatment apparatus is not limited to a configuration where file holder 13 to which file 11 is attached is provided to allow the measurement of the root canal length and the energization with the high-frequency current to be made as described in the above embodiments, and may be combined with a configuration where the treatment tool is motor-driven, a configuration where the treatment tool is ultrasonic-driven, or the like.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A dental treatment apparatus that energizes a root canal with a high-frequency current, the dental treatment apparatus comprising:
    a holder configured to hold an electrode placed in the root canal;
    a power supply configured to energize the electrode with the high-frequency current;
    root canal length measurement circuitry configured to electrically measure a position of a distal end of the electrode in the root canal; and
    controller circuitry configured to reduce a current value of a high-frequency current energizing the electrode as the position of the distal end of the electrode measured by the root canal length measuring circuit approaches the apex position,
    wherein the root canal length measurement circuitry is configured to electrically measure the position of the distal end of the electrode in the root canal based on respective impedance values between the electrode and a passive electrode in contact with a lip,
    wherein
    the controller circuitry is further configured to implement:
        a first control mode where the root canal length measurement circuitry is controlled to electrically measure the position of the distal end of the electrode in the root canal by energizing the electrode with a measurement signal, and
        a second control mode where the power supply is controlled to energize the electrode with the high-frequency current,
    wherein the controller circuitry is further configured to switch from the second control mode to the first control mode during a pause period where the energizing of the electrode with the high-frequency current is paused, the pause period being provided between two adjacent energization periods of a plurality of energization periods where the electrode is energized with the high-frequency current, and
    wherein each energization period includes a plurality of energizations.

2. The dental treatment apparatus according to claim 1, wherein
    the controller circuitry is further configured to
    measure the position of the distal end of the electrode in the root canal in the first control mode, and
    cause, in the second control mode, the power supply to energize the electrode with a current value within a predetermined range set based on the measured position of the distal end of the electrode.

3. The dental treatment apparatus according to claim 1, further comprising
    a detector configured to detect the current value which energizes the electrode, wherein
    the controller circuitry is further configured to cause, based on the current value detected by the detector, the power supply to control the current value of the high-frequency current which energizes the electrode by determining an output voltage that allows a current value within a predetermined range set based on the position of the distal end.

4. The dental treatment apparatus according to claim 3, wherein
when a current value greater than a maximum current value of the predetermined range is detected by the detector, the controller circuitry is further configured to cause the power supply to perform any one of: control of not starting the energizing of the electrode with the high-frequency current, control of stopping the energizing, or control of changing the current value with which the energizing is performed.

5. The dental treatment apparatus according to claim 4, wherein the controller circuitry is further configured to notify a user of information, wherein
when the current value detected by the detector falls outside the predetermined range, the controller circuitry is further configured to causes output of information showing that the current value of the high-frequency current with which the energizing is being performed falls outside the predetermined range.

6. The dental treatment apparatus according to claim 5, wherein
when a current value greater than a maximum current value of the predetermined range is detected by the detector, and the power supply is stopped from energizing the electrode with the high-frequency current, the controller circuitry is further configured to cause output of information showing that the energization with the high-frequency current is stopped, and
when a current value less than a minimum current value of the predetermined range is detected by the detector, the controller circuitry is further configured to cause output of information showing that the energization with the high-frequency current needs to be performed again.

7. The dental treatment apparatus according to claim 1, wherein
the controller circuitry is further configured to cause the power supply to perform any one of: control of not starting the energizing of the electrode with the high-frequency current in accordance with the information on the measured position of the distal end of the electrode in the root canal.

8. The dental treatment apparatus according to claim 1, wherein the controller circuitry is further configured to notify a user of information, wherein
the controller circuitry is further configured to cause output of information showing one of the first control mode and the second control mode being enabled.

9. The dental treatment apparatus according to claim 8, wherein
when the energizing of the electrode with the high-frequency current is stopped in accordance with the information on the measured position of the distal end of the electrode in the root canal, the controller circuitry is further configured to cause output of information showing that the energizing with the high-frequency current is stopped.

10. The dental treatment apparatus according to claim 8, wherein
when the measured position of the distal end of the electrode in the root canal satisfies a predetermined condition, the controller circuitry is further configured to cause output of information showing that the predetermined condition is satisfied.

11. The dental treatment apparatus according to claim 10, wherein
when a condition that the information on the measured position of the distal end of the electrode in the root canal changes by at least a predetermined percentage due to the energizing is satisfied as the predetermined condition, the controller circuitry is further configured to cause output of information showing that the position of the distal end of the electrode changes more abruptly than a predetermined value.

12. The dental treatment apparatus according to claim 1, wherein
the controller circuitry is further configured to cause, in accordance with the information on the measured position of the distal end of the electrode in the root canal, the power supply to control a time period where the electrode is energized with the high-frequency current.

13. The dental treatment apparatus according to claim 1, wherein
the controller circuitry is further configured to cause the power supply to control at least a time period where the electrode is energized with the high-frequency current to have a value of a product of the current value and a time period, where the energizing is performed with the high-frequency current, determined in accordance with the information on the measured position of the distal end of the electrode in the root canal.

14. The dental treatment apparatus according to claim 1, further comprising a display configured to output the information on the measured position of the distal end of the electrode in the root canal.

15. The dental treatment apparatus according to claim 1, wherein the current value of the high-frequency current is reduced such that the current of the high-frequency current energizing the electrode is stopped before the electrode reaches the apex.

16. A dental treatment apparatus that energizes a root canal with a high-frequency current, the dental treatment apparatus comprising:
a holder configured to hold an electrode placed in the root canal;
a power supply configured to energize the electrode with the high-frequency current;
a detector configured to detect the current value which energizes the electrode;
root canal length measurement circuitry configured to electrically measure a position of a distal end of the electrode in the root canal; and
controller circuitry configured to control a current value of a high-frequency current energizing the electrode, wherein
the controller circuitry is further configured to measure a time when a current value is detected by the detector as being less than a minimum current value of a predetermined range and to output the measured time, wherein
the controller circuitry is further configured to implement:
a first control mode where the root canal length measurement circuitry is controlled to electrically measure the position of the distal end of the electrode in the root canal by energizing the electrode with a measurement signal, and
a second control mode where the power supply is controlled to energize the electrode with the high-frequency current,
wherein the controller circuitry is further configured to switch from the second control mode to the first control mode during a pause period where the energizing of the electrode with the high-frequency current is paused, the pause period being provided between two adjacent energization periods of a plurality of energization periods where the electrode is energized with the high-frequency current, and wherein each energization period includes a plurality of energizations.

17. A dental treatment apparatus that energizes a dental treatment site with a high-frequency current, the dental treatment apparatus comprising:
    a holder configured to hold an electrode placed at the dental treatment site;
    a power supply configured to energize the electrode with the high-frequency current under constant current drive;
    root canal length measurement circuitry to electrically measure a position of a distal end of the electrode in a root canal; and
    controller circuitry configured to reduce a current value of a high-frequency current energizing the electrode as the position of the distal end of the electrode measured by the root canal length measuring circuit approaches the apex position,
    wherein the root canal length measurement circuitry is configured to electrically measure the position of the distal end of the electrode in the root canal based on respective impedance values between the electrode and a passive electrode in contact with a lip,
    wherein the controller circuitry configured to reduce the current value of the high-frequency current energizing such that an actual current passing through the electrode is reduced,
    wherein
    the controller circuitry is further configured to implement:
        a first control mode where the root canal length measurement circuitry is controlled to electrically measure the position of the distal end of the electrode in the root canal by energizing the electrode with a measurement signal, and
        a second control mode where the power supply is controlled to energize the electrode with the high-frequency current,
    wherein the controller circuitry is further configured to switch from the second control mode to the first control mode during a pause period where the energizing of the electrode with the high-frequency current is paused, the pause period being provided between two adjacent energization periods of a plurality of energization periods where the electrode is energized with the high-frequency current, and
    wherein each energization period includes a plurality of energizations.

* * * * *